(12) United States Patent
Vanderheiden et al.

(10) Patent No.: US 8,780,047 B2
(45) Date of Patent: Jul. 15, 2014

(54) KEYBOARD SYSTEM AND METHOD FOR PROVIDING IMPROVED ACCESS TO AN ELECTRONIC DEVICE

(75) Inventors: Gregg C. Vanderheiden, Madison, WI (US); J. Bern Jordan, Madison, WI (US); David P. Kelso, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1093 days.

(21) Appl. No.: 12/243,385

(22) Filed: Oct. 1, 2008

(65) Prior Publication Data

US 2010/0079372 A1  Apr. 1, 2010

(51) Int. Cl.
*G06F 19/00* (2011.01)

(52) U.S. Cl.
USPC ............. 345/168; 345/173; 341/21; 715/727; 715/865

(58) Field of Classification Search
USPC ............. 345/168, 173; 341/21; 715/727, 865
See application file for complete search history.

(56) References Cited

U.S. PATENT DOCUMENTS

| | | |
|---|---|---|
| D310,820 S | 9/1990 | Watson et al. |
| 4,989,610 A * | 2/1991 | Patton et al. .................. 600/508 |
| 5,155,806 A * | 10/1992 | Hoeber et al. ................ 715/711 |
| D348,065 S | 6/1994 | Madill et al. |
| D370,663 S | 6/1996 | Swain et al. |
| 6,049,328 A * | 4/2000 | Vanderheiden ............... 345/173 |
| 6,073,033 A * | 6/2000 | Campo ......................... 455/566 |
| D436,579 S | 1/2001 | Mayo et al. |
| D451,482 S | 12/2001 | Vanderheiden et al. |
| 6,415,164 B1 * | 7/2002 | Blanchard et al. ............ 455/566 |
| 6,624,803 B1 | 9/2003 | Vanderheiden et al. |
| D535,627 S | 1/2007 | Merritt et al. |
| D543,159 S | 5/2007 | Merritt et al. |
| 2003/0040340 A1 * | 2/2003 | Smethers ...................... 455/566 |
| 2003/0046451 A1 * | 3/2003 | Prabhakaran .................... 710/1 |
| 2004/0119685 A1 * | 6/2004 | Harries et al. ................ 345/156 |
| 2005/0113887 A1 * | 5/2005 | Bauhahn et al. ................ 607/61 |

* cited by examiner

*Primary Examiner* — Sumati Lefkowitz
*Assistant Examiner* — Jose Soto Lopez
(74) *Attorney, Agent, or Firm* — Boyle Fredrickson, S.C.

(57) ABSTRACT

An interface system and method are provided for facilitating cross-disability access to an electronic device. A first screen of a plurality of screens is displayed on the electronic device. Each screen includes at least one of a non-input element and an input element. The interface system includes a keyboard having a plurality of alpha-numeric keys and a plurality of keys or selectors that allow a user to navigate through the non-input elements and input elements of the plurality of screens.

26 Claims, 4 Drawing Sheets

FIG. 4

KEYBOARD SYSTEM AND METHOD FOR PROVIDING IMPROVED ACCESS TO AN ELECTRONIC DEVICE

REFERENCE TO GOVERNMENT GRANT

This invention was made with United States government support awarded by the following agencies: Department of Education, Grant Number H133E030012. The United States government has certain rights in this invention.

FIELD OF THE INVENTION

The invention relates generally to human-machine interfaces (HMIs), and in particular, to an interface system and method for providing cross-disability access to an electronic device.

BACKGROUND AND SUMMARY OF THE INVENTION

With a touch screen system, the type, size, and number of the virtual buttons may be readily changed by changing the computer's program without changes in the associated hardware. Thus, the touch screen system offers a user-interface that may be flexibly tailored to a particular application. The ability to divide virtual buttons among different screens and to display only those screens needed by the user's particular task can simplify data entry. The combination of text and graphical elements on the screen along with the virtual buttons can help to further guide the user through the steps of data input.

Normally, a touch screen system uses a touch screen panel which is placed directly over the viewing area of a standard computer display, for example, a cathode ray tube ("CRT") or a liquid crystal display ("LCD"). The touch screen panel provides a signal to a computer associated with the computer display indicating where on the surface of the display a stylus or finger is placed. This signal may be generated, for example, by acoustic systems detecting absorption of sound by a finger on the surface of the display; by systems using crossed beams of infrared light arrayed along x and y axes which are broken by the finger; or by laminated transparent electrodes which are physically compressed against each other to provide a point electrical contact that may be interpreted as an x and y coordinate.

Frequently, a touch screen will be used in conjunction with a computer contained in a kiosk for public use. The computer may have so-called multi-media capabilities providing both a visual and audio program intended to help members of the public obtain information or conduct transactions. Despite the advantage of touch screen systems in such applications, like many novel interface controls, they present a barrier to many people with disabilities. Those with impaired vision perceive only the featureless surface of the display screen knowing that it may contain one or more virtual buttons of arbitrary placement and functions. Those unfamiliar with the language of the legends on the buttons or those who cannot read, are also foreclosed from much of the information presented by touch screen systems. Critical audio information in multi-media presentations will not be received by deaf users. Those with limited mobility may be unable to reach or operate the touch screen surface.

Heretofore, incorporating accessibility into kiosks and other touch screen systems has typically involved adding buttons, keyboards or other mechanical controls for the systems. In many kiosk designs, the addition of these buttons, keyboards or other mechanical controls may be limited by a lack of space, expense or various other constraints. Hence, a long felt need has existed for an interface system and method for use in a kiosk that provide cross-disability access to the kiosk.

Therefore, it is a primary object and feature of the present invention to provide an interface system and method for providing cross-disability access to an electronic device.

It is a further object and feature of the present invention to provide an interface system and method for providing cross-disability access to an electronic device that is simple and intuitive to utilize.

In accordance with the present invention, an interface system is provided for facilitating cross-disability access to an electronic device. The electronic device is operatively connected to an electronic computer. The interface system includes a software program stored on an electronic computer for generating a plurality of screens for display on the electronic device. Each screen includes at least one of a non-input element or an input element. A keyboard is operatively connected to the electronic computer. The keyboard includes an up selector, a down selector, an action selector, a next selector, a back selector and a help selector. The up selector has a non-actuated state and an actuated state. The software program moves a navigation highlight between adjacent elements displayed on a first screen in a first direction in response to actuation of the up selector. The down selector has a non-actuated state and an actuated state wherein the software program moves the navigation highlight between adjacent elements displayed on the first screen in a second direction in response to actuation of the down selector. The action selector has a non-actuated state and an actuated state wherein the software program activates a highlighted element displayed on the first screen in response to actuation of the action selector. The back selector has a non-actuated state and an actuated state wherein the software program navigates to a previous screen in response to actuation of the back selector when the highlighted element is the non-input element. The next selector has a non-actuated state and an actuated state wherein the software program navigates to a subsequent screen in response to actuation of the next selector when the highlighted element is the non-input element. The help selector has a non-actuated state and an actuated state. The computer software program provides context sensitive help to a user in response to actuation of the help selector.

The keyboard includes a plurality of alpha-numeric keys having non-actuated and actuated states. The input element includes a plurality of character spaces. The software program causes an alpha-numeric character to be displayed in a character space in the input element in response to actuation of a corresponding alpha-numeric key. In addition, the software program moves a text cursor back one character space in response to actuation of the back selector when the highlighted element is the input element. Similarly, the software program moves the text cursor forward one character space in response to actuation of the next selector when the highlighted element is the input element.

The input element may include a plurality of lines such that the software program inserts a carriage return in the input element in response to actuation of the action selector. Alternatively, the input element may be a first input element and the first screen includes a plurality of input elements. The first input element includes a single line and the software program moves the navigation highlight to a second input element in response to actuation of the action selector. If the input element is a last input element on the first screen, the software program navigates to a subsequent screen in response to actuation of the action selector.

In accordance with a further aspect of the present invention, an interface system is provided for facilitating cross-disability access to an electronic device. The electronic device is operatively connected to an electronic computer. The interface system includes a software program stored on an electronic computer for generating a plurality of screens for display on the electronic device. Each screen includes at least one of a non-input element or an input element. A keyboard is operatively connected to the electronic computer. The keyboard including a plurality of alpha-numeric keys, a first set of selectors, an action selector, a second set of selectors and a help selector. The plurality of alpha-numeric keys have non-actuated and actuated states and the first set of selectors have non-actuated and actuated states. The software program moves a navigation highlight between adjacent elements displayed on a first screen in response to actuation of one of the first set of selectors. The action selector has a non-actuated state and an actuated state. The software program activates a highlighted element displayed on the first screen in response to actuation of the action selector. The second set of selectors have non-actuated and actuated states. The software program navigates through the plurality of screens in response to actuation of one of the second set of selectors when the highlighted element is the non-input element. The help selector has a non-actuated state and an actuated state. The computer software program provides context sensitive help to a user in response to actuation of the help selector.

The first set of selectors includes an up selector and a down selector. The up selector has a non-actuated state and an actuated state. The software program moves a navigation highlight between adjacent elements displayed on a first screen in a first direction in response to actuation of the up selector. The down selector has a non-actuated state and an actuated state. The software program moves the navigation highlight between adjacent elements displayed on the first screen in a second direction in response to actuation of the down selector.

The second set of selectors includes a back selector and a next selector. The back selector has a non-actuated state and an actuated state. The software program navigates to a previous screen in response to actuation of the back selector when the highlighted element is the non-input element. The next selector has a non-actuated state and an actuated state. The software program navigates to a subsequent screen in response to actuation of the next selector when the highlighted element is the non-input element. The input element includes a plurality of character spaces. The software program causes an alpha-numeric character to be displayed in a character space in the input element in response to actuation of a corresponding alpha-numeric key. The software program moves a text cursor back one character space in response to actuation of the back selector when the highlighted element is the input element. Similarly, the software program moves the text cursor forward one character space in response to actuation of the next selector when the highlighted element is the input element. If the input element includes a plurality of lines, the software program inserts a carriage return in the input element in response to actuation of the action selector.

The input element is a first input element and a first screen includes a plurality of input elements. If the first input element includes a single line, the software program moves the navigation highlight to a second input element in response to actuation of the action selector. If the input element is a last input element on a first screen, the software program navigates to a subsequent screen in response to actuation of the action selector.

In accordance with a further aspect of the present invention, a method is provided for facilitating cross-disability access to an electronic device. The electronic device is operatively connected to an electronic computer. The method includes the step of displaying a first screen of a plurality of screens on the electronic device. Each screen includes at least one of a non-input element or an input element. A navigation highlight is moved between adjacent elements displayed on the first screen in response to actuation of one of a first set of selectors. A highlighted element displayed on the first screen is activated in response to actuation of an action selector. The plurality of screens are navigated in response to actuation of one of a second set of selectors when the highlighted element is the non-input element. Context sensitive help is provided to a user in response to actuation of a help selector.

The first set of selectors includes an up selector and a down selector. The up selector has a non-actuated state and an actuated state. The software program moves a navigation highlight between adjacent elements displayed on a first screen in a first direction in response to actuation of the up selector. The down selector has a non-actuated state and an actuated state. The software program moves the navigation highlight between adjacent elements displayed on the first screen in a second direction in response to actuation of the down selector.

The second set of selectors includes a back selector and a next selector. The back selector has a non-actuated state and an actuated state. The software program navigates to a previous screen in response to actuation of the back selector when the highlighted element is the non-input element. The next selector has a non-actuated state and an actuated state. The software program navigates to a subsequent screen in response to actuation of the next selector when the highlighted element is the non-input element. The input element includes a plurality of character spaces. An alpha-numeric character is displayed in a character space in the input element in response to actuation of a corresponding alpha-numeric key.

A text cursor is moved back one character space in response to actuation of the back selector when the highlighted element is the input element. The text cursor is moved forward one character space in response to actuation of the next selector when the highlighted element is the input element. The input element includes a plurality of lines and a carriage return is inserted in the input element in response to actuation of the action selector. The input element is a first input element. A first screen includes a plurality of input elements and the first input element includes a single line. The navigation highlight is moved to a second input element in response to actuation of the action selector. If the input element is a last input element on the first screen, the method includes the additional step of navigating to a subsequent screen in response to actuation of the action selector.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiments.

In the drawings.

DETAILED DESCRIPTION OF THE DRAWINGS

Figure 1:
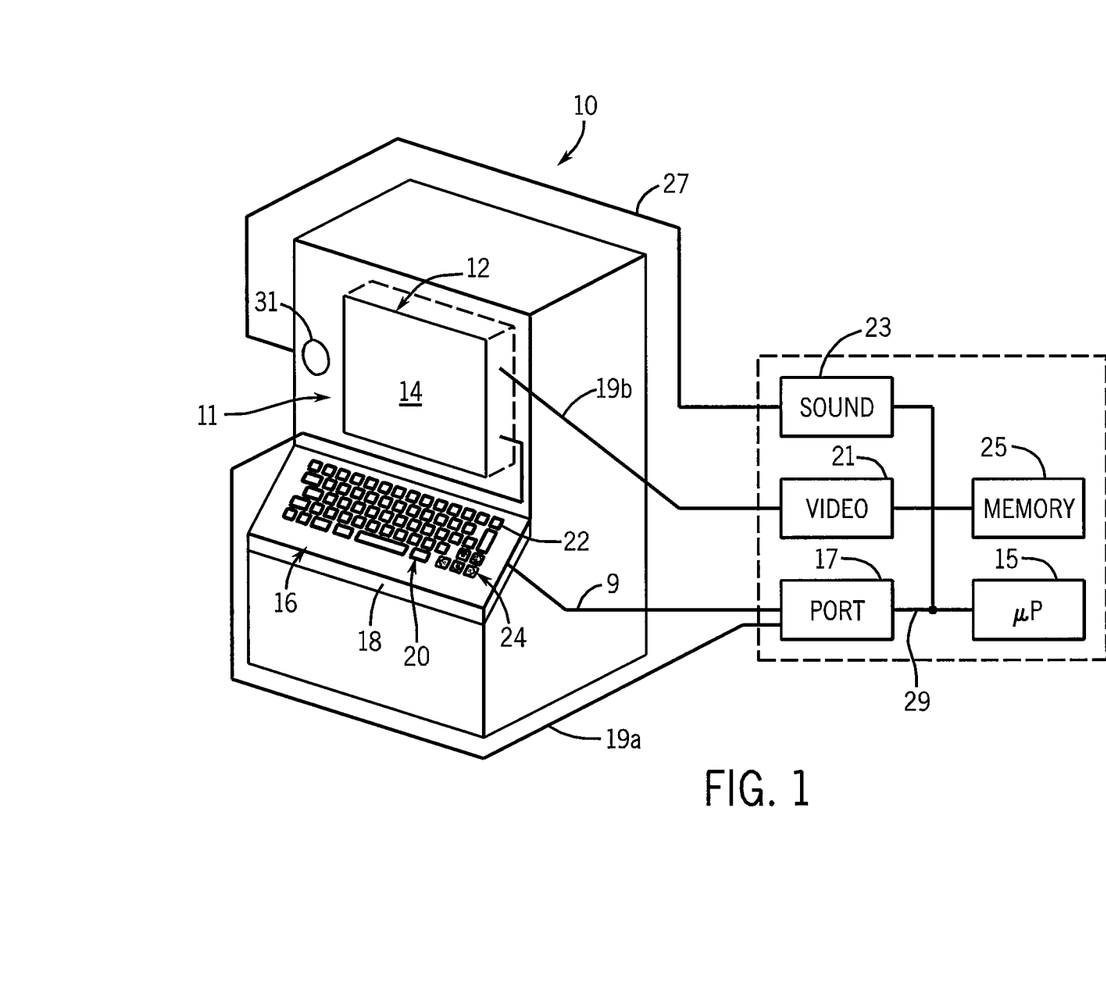
FIG. 1 is a schematic view of a kiosk incorporating a keyboard system in accordance with the present invention.

Referring now to FIG. 1, a schematic of a kiosk is generally designated by a reference numeral 10. Kiosk 10 includes touch screen system 11 incorporating touch screen 12 positioned in front of and in alignment with a standard computer display, for example, a cathode ray tube or a liquid crystal display. Touch screen 12 is well known in the art and may apply a number of different technologies, including those employing crossed beams of infrared light (which detect a finger or stylus by the interruption of one or more beams), and those employing layered transparent electrodes (which detect the finger or stylus by its deforming layers and causing the electrodes to touch). As is conventional, touch screen 12 includes an outer, display surface 14 on which the stylus or finger is placed, for reasons hereinafter described.

As is conventional, touch screen 12 and the computer display are operatively connected to port 17 and video board 21 via lines 19a and 19b, respectively. Port 17 is, in turn, operatively connected to central processing unit 15 via bus 29. Touch screen 12 provides a user interface with central processing unit 15 that is flexibly tailored to a particular application operating in accordance with a computer software program stored on memory 25. Memory 25 also holds other data and software programs including the software program that will be described below forming part of the present invention. The program may be implemented in a number ways depending on the particular device and so a functional description of the program will be provided such as would allow it to be readily incorporated into standard electronic devices by one of ordinary skill in the art. Video board 21 is also connected to and receives data generated by execution of the software program by central processing unit 15 over bus 29 in order to provide video data to touch screen 12.

It is intended for touch screen 12 to provide a high-resolution X-Y coordinate signal to central processing unit 15 in response to the touching or "pressing" of the display surface of the touch screen. Typically in operation, one of a plurality of screens is displayed by central processing unit 15 in response to the computer program stored in memory 25 and/or inputs from the user, as heretofore described. However, this arrangement failed to address the following disabilities: (1) blind individuals; (2) individuals who have difficulty seeing or reading the kiosk, either because user's vision blurs the image or because the user cannot interpret the written legends on the screen (this may be result of problems understanding written language or an unfamiliarity with the particular written language or graphic element on the kiosk); (3) individuals who have difficulty hearing; and (4) individuals who have difficulty reaching or touching the kiosk screen, for example, individuals with restricted mobility including those using wheelchairs. Further, kiosk 10 may be used use by individuals with combinations of above described disabilities including those who cannot hear or who cannot see the kiosk.

Kiosk 10 must be accessible to individuals with an arbitrary one or combination of these disabilities in order to effectively serve its purpose. More specifically, in order for kiosk 10 to meet the dual requirements of maintaining the advantageous characteristics of the touch screen system 11 in presenting data quickly to users who are not disabled and providing access to the same information by users with disabilities with a minimum of additional effort, sound card 23 and keyboard 16 are provided. Sound card 23 is operatively connected to kiosk 10 by line 27 and to central processing unit 15. Sound card 23 receives data from the bus 29 by virtue of execution of the computer program by central processing unit 15 to produce sound communicated to an earphone jack or speaker 31 provided at the front of kiosk 10.

Figure 2:
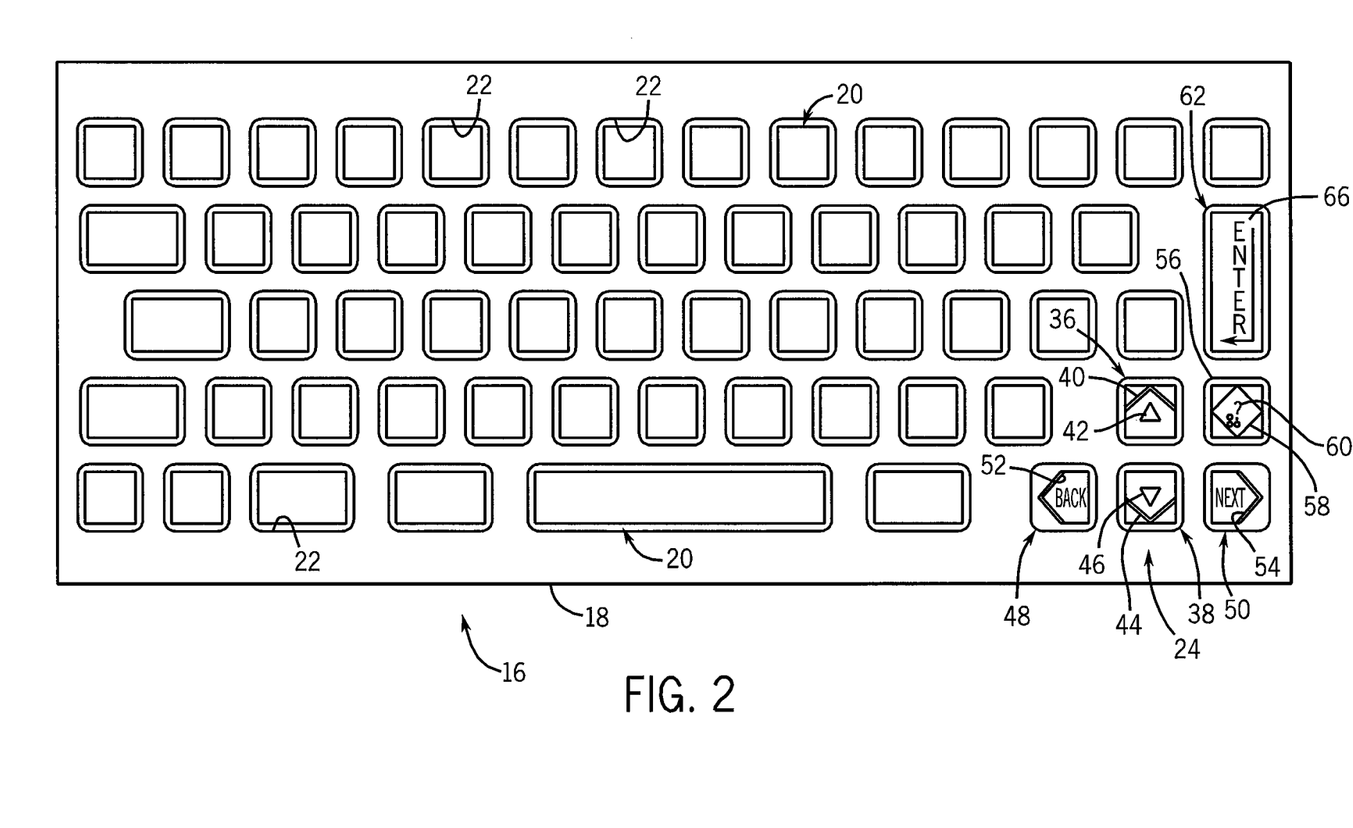
FIG. 2 is a top plan view of the keyboard system of the present invention.

As is conventional, keyboard 16 includes housing 18 having a circuit board received therein. A plurality of standard hard contact keys 20 project from corresponding openings 22 in housing 18. Each key 20 of keyboard 16 corresponds to a standard alpha-numeric character on a conventional keyboard. Small conductive plates are provided on the inner ends of keys 20. When a key 20 of keyboard 16 is depressed, the corresponding conductive plate on the inner end of the key engages the circuit board, thereby closing a circuit on the circuit board. In response, a corresponding signal associated with the depressed key 20 of keyboard 16 is sent to central processing unit 15 via port 17 along line 19. Biasing structures are provided to urge keys 20 toward their non-depressed position.

Referring to FIG. 2, keyboard 16 further includes a plurality of access keys, hereinafter referred to collectively by the reference number 24. It can be appreciated that the orientation and locations of access keys 24 on keyboard 16, as hereinafter described, may be varied without deviating from the scope of the present invention. Access keys 24 include up key 36 and down key 38 having generally square configurations and being axially aligned with each other. It can be appreciated that the orientation and locations of the up key 36 and down key 38 may be varied, although ideally consistency should be maintained for the benefit of the individuals who need to use this system in a variety of different contexts. Up key 36 includes an upwardly directed chevron 40 projecting from the upper surface thereof. Triangular shaped indicia 42 is provided on upper surface of up key 36 at a location below and directed towards chevron 40. Down key 38 includes a downwardly directed chevron 44 projecting from the upper surface thereof. Triangular shaped indicia 46 is provided on upper surface of down key 38 at a location above and directed towards chevron 44. It is intended for chevrons 40 and 44 to present by touch and sight the shape of arrows pointing upward and downward along a generally vertical axis to identify up key 36 and down key 38 to a user. As is conventional, up and down keys 36 and 38, respectively, are movable between a non-depressed condition and a depressed condition.

Access keys 24 further includes back key 48 and next key 50 having generally square configurations and being axially aligned with each other. It is contemplated for back key 48 and next key 50 to be positioned on opposites sides of down key 38. It can be appreciated that the orientation and locations of the back key 48 and down key 50 may be varied, although ideally consistency should be maintained for the benefit of the individuals who need to use this system in a variety of different contexts. Back key 48 includes a leftwardly directed chevron 52 projecting from the upper surface thereof. The term "BACK" is provided on upper surface of back key 48 at a location to the right of chevron 52. Next key 50 includes a rightwardly directed chevron 54 projecting from the upper surface thereof. The term "NEXT" is provided on upper surface of next key 38 at a location to the left of chevron 54. It is intended for chevrons 52 and 54 to present by touch and sight the shape of arrows pointing leftward and rightward along a generally horizontal axis to identify back key 48 and next key 50 to a user. As is conventional, back and next keys 48 and 50, respectively, are movable between a non-depressed condition and a depressed condition.

Access keys 24 further includes a help key 56 having a generally square configuration and being positioned to the right of up key 36 and above next key 50. Diamond-shaped tactile indicator 58 (i.e., a square with one diagonal oriented vertically) projects from the upper surface of help key 56. Indicia 60 may be provided on the upper surface of diamond-shaped tactile indicator 58 to identify help key 56 to a potential user. As is conventional, help key 56 is movable between a non-depressed condition and a depressed condition. When help key 56 of keyboard 16 is depressed, the corresponding conductive plate on the inner end of help key 56 engages the circuit board, thereby closing a circuit on the circuit board and generating in a corresponding signal associated with the depressed help key 56 of keyboard 16 that is sent to central processing unit 15 via port 17 along line 9. Central processing unit 15 controls operation of help key 56 in accordance with the software program stored on memory 25. By way of example, central processing unit 15 may provide context sensitive help in the form of an audio reading of text displayed on touch screen 12 or a textual display on touch screen 12 in response to actuation of help key 56.

Finally, access keys 24 include action key 62 having a generally rectangular configuration and being positioned above help key 56. Indicator 66 (i.e., an L-shaped indicia) is provided on the upper surface of action key 62. The term "ENTER" may be provided on the upper surface of action key 62 adjacent indicator 66 in order to identify action key 62 to a potential user. As is conventional, action key 62 is movable between a non-depressed condition and a depressed condition. When action key 62 of keyboard 16 is depressed, the corresponding conductive plate on the inner end of action key 62 engages the circuit board, thereby closing a circuit on the circuit board and generating a corresponding signal associated with the depressed help key 56 of keyboard that is sent to central processing unit 15 via port 17 along line 9. Central processing unit 15 controls operation of action key 62 in accordance with the software program stored on memory 25. More specifically, it is contemplated for action key 62 to function as a standard "enter" key on a conventional keyboard. In addition, it is contemplated for action key 62 to be used by user to select, mark, and/or activate elements displayed on touch screen 12 and to reread text and cause text to be spelled over speaker 31, as hereinafter described.

Figure 3:
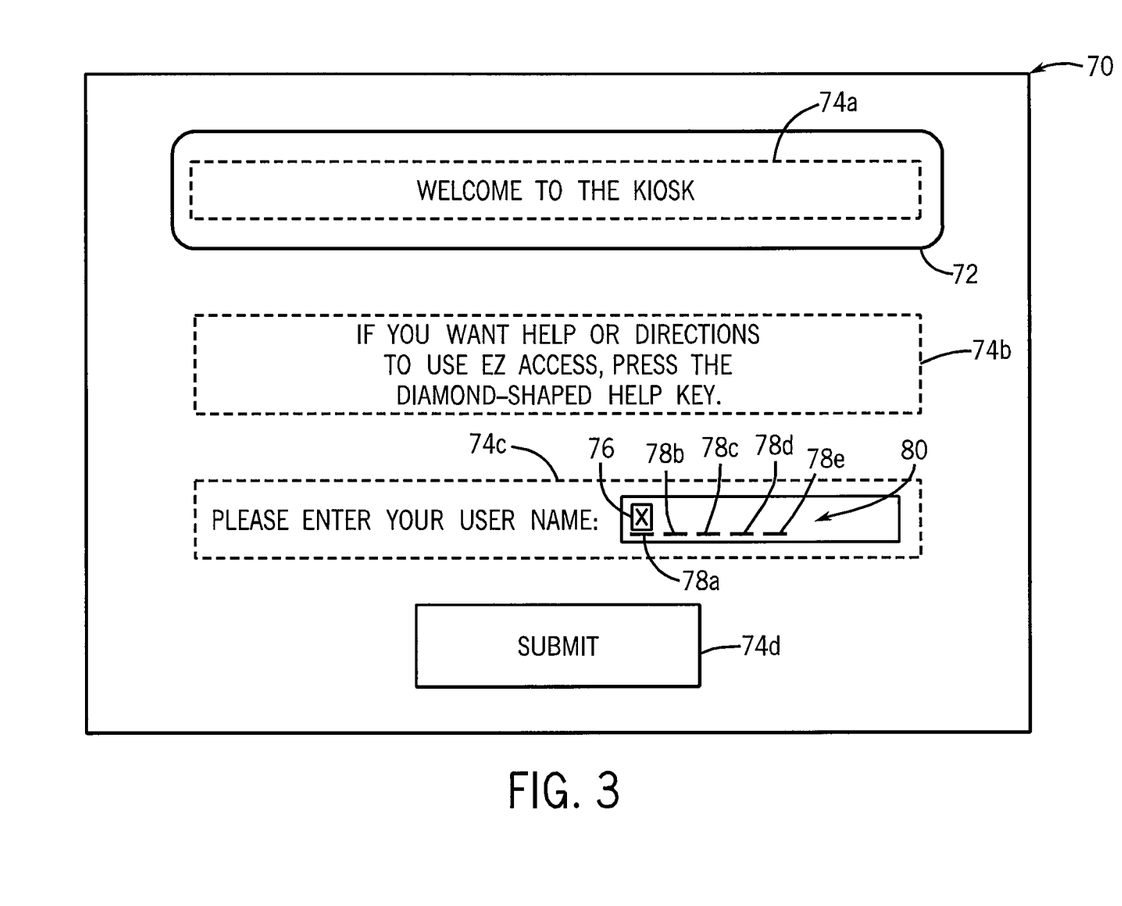
FIG. 3 is a front plan view of a first exemplary screen for display on the kiosk of FIG. 1.

It is intended for kiosk 10 to present data quickly to users who are not disabled, but to also provide access to the same information to users with disabilities with a minimum of additional effort. Referring to FIG. 3, in operation, an exemplary access screen 70 to be displayed on touch screen 12 by central processing unit 15 in response to the internal stored program stored on memory 25, is depicted. Kiosk 10 provides a user with the ability to utilize multiple paths and methods of communication. By way of example, a user may utilize touch screen 12 or keys 20 of keyboard 16 to control operation of kiosk 10. Alternatively, it is contemplated for a disabled user to use access keys 24 in combination with touch screen 12 and/or keys 20 of keyboard 16, as hereinafter described, to control kiosk 10.

It is intended for access keys 24 to address the following disabilities: (1) blind individuals, (2) individuals who have difficulty seeing or reading the touch screen 12 of kiosk 10, either because the user's vision blurs the image or because the user cannot interpret the written legends on the screen (this may be result of problems understanding written language or an unfamiliarity with the particular written language or graphic element on touch screen 12) (3) individuals who have difficulty hearing, and (4) individuals who have difficulty reaching or touching touch screen 12, for example, individuals with restricted mobility including those using wheelchairs. Access keys 24 further contemplate use by individuals with combinations of disabilities including those who cannot hear or who cannot see touch screen 12.

In operation, action key 62 may be first pressed to invoke the access screen 70. Alternatively, access screen 70 may be a default screen that occurs whenever access by a previous use is terminated, for example, through lack of use for a fixed period of time. Referring still to FIGS. 2-3, up key 36 allows a user to move a navigation highlight 72 upwardly on a given screen, e.g. access screen 70, through a series of elements 74a-74d to highlight a user-desired element 74a-74d, as hereinafter described. It can be appreciated that elements 74a-74d may take the form of a non-input element containing information, e.g., alpha-numeric data (e.g., elements 74a-74b); an input element allowing alpha-numeric data to be inputted with keys 20 of keyboard 16 into an editable element comprised of one or characters (e.g., element 74c); or a non-input element such as an activation element (e.g., element 74d) that identifies an action/function to be performed. By way of example, activation element may take the form of a virtual button for submitting data entered on a screen, for requesting help, or for a similar type of activity. Down key 38 allows a user to move navigation highlight 72 downwardly on a given screen, e.g. access screen 70 through elements 74a-74d.

With a user selected non-input element 74a-74b highlighted, as heretofore described, action key 62 may be depressed causing central processing unit 15 to provide an audio reading of the text within non-input element 74a-74b over speaker 31. With a user selected input element 74c highlighted, as heretofore described, action key 62 may be depressed causing central processing unit 15 to provide an audio reading of any text within input element 74c over speaker 31 and to provide text cursor 76 at the first empty character space, e.g., first character space 78a, of editable element 80 of input element 74c. Editable element 80 may take the form of a single line editable element defined by a plurality of character spaces 78a-78e or a multi-line editable element 83 having multiple editable lines 82 and 84, FIG. 4, wherein each editable line 82 and 84 is defined by a plurality of character spaces 86a-86e and 87a-87e, respectively. In the event that editable element 83 is a multi-line field, depressing action key 62 for a second time will result in a carriage return being entered into editable element 83 and in text cursor 76 focusing at first character 87a of editable line 84 of input element 90. On a last single line editable element 80 on a screen or in the event that editable element 80 is the only editable line on a screen, depressing action key 62 for a second time will result in submission of the data entered in editable elements 80 and 83, and invoking of a subsequent screen 88.

Figure 4:
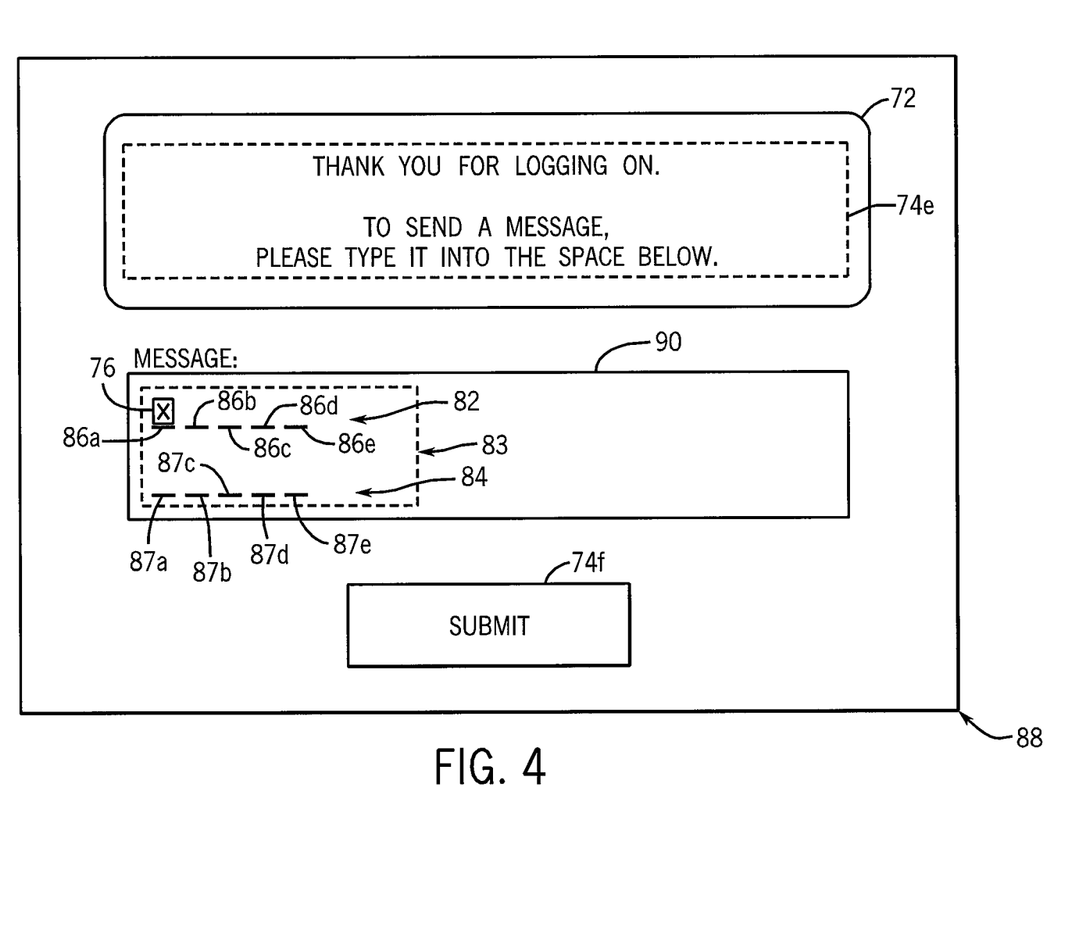
FIG. 4 is a front plan view of a second exemplary screen for display on the kiosk of FIG. 1.

It can be appreciated that the software program stored on memory 25 may generate a series of screens, e.g., screens 70 and 88. Screen 88 may include one or more non-input elements 74e-74f, one or more input elements 90, or any combination thereof. On all screens without input elements, actuation of the back key 48 allows a user to scroll to the prior screen of the series. Similarly, on screens with an input element, actuation of back key 48 will allow a user to scroll to the prior screen of a series screens if the navigation highlight 72 is not positioned to highlight an input element. In an input element, with text cursor 76 provided in an editable element 80 and 83, actuation of the back key 48 causes text cursor 76 to move back one character space within the editable element 80 and 83, and causes central processing unit 15 to provide an audio reading of the character just stepped over on speaker 31. With text cursor 76 in the first character space of the first editable line of an editable element 80 and 83, actuation of the back key 48 may elicit an error tone and/or help information about actuating back key 48 being displayed on touch screen 12 and/or provided over speaker 31.

On all screens without input elements, actuation of the next key 50 allows a user to scroll to the subsequent screen of the series. Similarly, on screens with an input element, actuation of next key 50 will allow a user to scroll to the subsequent screen of a series screens if the navigation highlight 72 is not highlighting an input element. In addition, on screens with an input element, any data inputted in the input element[s] is transmitted to the central processing unit 15 for processing in accordance with the software program stored on memory 25. In an input element, with text cursor 76 provided in an editable element 80 and 83, actuation of next key 50 causes text cursor 76 to move forward one character space within the editable element 80 and 83, and causes central processing unit 15 to provide an audio reading of the character just stepped over on speaker 31. With text cursor 76 in the last character space of an editable element 80 and 83, actuation of the next key 50 may elicit an error tone and/or help information about actuating next key 50 may be displayed on touch screen 12 and/or provided over speaker 31.

In addition to the above-described functionality, it is contemplated for navigation highlight 72 to automatically jump to the associated input element into which the typed characters are entered, when a user starts typing. More specifically, once a user starts typing, navigation highlight 72 appears around the input element and back key 48 and next key 50 behave to move text cursor 76, as heretofore described. As a result, actuation of back key 48 or next key 50 will allow a user to move backwards or forwards, respectively, through the screens 70 and 88 until a user starts typing.

It can be appreciated that by incorporating access keys 24 into a conventional keyboard and utilizing the above-described behaviors, accessibility to kiosk 10 for individuals with disabilities is improved with added convenience to users without disabilities. The enhanced functionality of access keys 24 allows for easy navigation through screens 70 and 88, and through the elements 74a-74f and 90 on such screens. Users are still able to move text cursor 76 via keyboard 16 and use action key 62 as they might for typical computer interactions.

Various modes of carrying out the invention are contemplated as being within the scope of the following claims particularly pointing and distinctly claiming the subject matter that is regarded as the invention.

We claim:

1. An interface system for providing cross-disability access to an electronic device, the electronic device operatively connected to an electronic computer, the interface system comprising:
    a software program stored on an electronic computer for generating a plurality of screens for display, a first displayed screen including at least one non-input element having text therein which is unchangeable by a user and at least one input element;
    a touch screen for selectively displaying each of the plurality of screens thereon, the user navigating between the at least one non-input element and at least one input element of the first displayed screen and through the plurality of screens by the touching the at least one non-input element or at least one input element; and
    a keyboard operatively connected to the electronic computer, the keyboard including:
    an up selector having a non-actuated state and an actuated state, wherein the software program moves a navigation highlight between adjacent elements displayed on the first displayed screen in a first direction in response to actuation of the up selector;
    a down selector having a non-actuated state and an actuated state, wherein the software program moves the navigation highlight between adjacent elements displayed on the first displayed screen in a second direction in response to actuation of the down selector;
    an action selector having a non-actuated state and an actuated state, wherein the software program activates a highlighted element displayed on the first displayed screen in response to actuation of the action selector;
    a back selector having a non-actuated state and an actuated state, wherein the software program navigates to a previous screen in response to actuation of the back selector when the highlighted element is the non-input element;
    a next selector having a non-actuated state and an actuated state, wherein the software program navigates to a subsequent screen in response to actuation of the next selector when the highlighted element is the non-input element; and
    a help selector having a non-actuated state and an actuated state, the computer software program providing context sensitive help to a user in response to actuation of the help selector;
    wherein:
    activation of a highlighted non-input element displayed on the first displayed screen in response to actuation of the action selector generates an audio reading of the text in the highlighted non-input element; and
    activation of a highlighted input element having a plurality of character spaces displayed on the first screen in response to actuation of the action selector causes a text cursor to be displayed in a character space in the highlighted input element.

2. The interface system of claim 1 wherein:
    the keyboard includes a plurality of alpha-numeric keys having non-actuated and actuated states; and
    the software program causes an alpha-numeric character to be displayed in a character space in the highlighted input element in response to actuation of a corresponding alpha-numeric key.

3. The interface system of claim 2 wherein the software program moves the text cursor back one character space in the highlighted input element in response to actuation of the back selector.

4. The interface system of claim 2 wherein the software program moves the text cursor forward one character space in the highlighted input element in response to actuation of the next selector.

5. The interface system of claim 2 wherein:
    the highlighted input element includes a plurality of lines; and
    the software program inserts a carriage return in the highlighted input element in response to actuation of the action selector.

6. The interface system of claim 2 wherein:
    the highlighted input element is a first input element;
    the first displayed screen includes a plurality of input elements;
    the first input element includes a single line; and
    the software program moves the navigation highlight to a second input element in response to actuation of the action selector.

7. The interface system of claim 2 wherein:
    the highlighted input element is a last input element on the first displayed screen; and the software program navigates to a subsequent screen in response to actuation of the action selector.

8. An interface system for providing cross-disability access to an electronic device, the electronic device operatively connected to an electronic computer, the interface system comprising:
a software program stored on an electronic computer for generating a plurality of screens for display, a first screen including at least one non-input element having text therein which is unchangeable by a user and at least one input element;
a touch screen for selectively displaying each of the plurality of screens thereon, the user navigating between the at least one non-input element and at least one input element of the first screen and through the plurality of screens by the touching the at least one non-input element or the at least one input element; and
a keyboard operatively connected to the electronic computer, the keyboard including:
a plurality of alpha-numeric keys having non-actuated and actuated states;
a first set of selectors having non-actuated and actuated states, wherein the software program moves a navigation highlight between adjacent elements displayed on the first screen in response to actuation of one of the first set of selectors;
an action selector having a non-actuated state and an actuated state, wherein the software program activates a highlighted element displayed on the first screen in response to actuation of the action selector; and
a second set of selectors having non-actuated and actuated states, wherein the software program navigates through the plurality of screens in response to actuation of one of the second set of selectors when the highlighted element is the non-input element;
wherein:
activation of a highlighted non-input element displayed on the first screen in response to actuation of the action selector generates an audio reading of the text in the highlighted non-input element; and
activation of a highlighted input element having a plurality of character spaces displayed on the first screen in response to actuation of the action selector causes a text cursor to be displayed in a character space in the highlighted input element.

9. The interface system of claim 8 wherein the keyboard includes a help selector having a non-actuated state and an actuated state, the computer software program providing context sensitive help to a user in response to actuation of the help selector.

10. The interface system of claim 8 wherein the first set of selectors includes:
an up selector having a non-actuated state and an actuated state, wherein the software program moves a navigation highlight between adjacent elements displayed on the first screen in a first direction in response to actuation of the up selector; and
a down selector having a non-actuated state and an actuated state, wherein the software program moves the navigation highlight between adjacent elements displayed on the first screen in a second direction in response to actuation of the down selector.

11. The interface system of claim 8 wherein the second set of selectors includes:
a back selector having a non-actuated state and an actuated state, wherein the software program navigates to a previous screen in response to actuation of the back selector when the highlighted element, is the non-input element; and
a next selector having a non-actuated state and an actuated state, wherein the software program navigates to a subsequent screen in response to actuation of the next selector when the highlighted element is the non-input element.

12. The interface system of claim 11 wherein:
the software program causes an alpha-numeric character to be displayed in a character space in the highlighted input element in response to actuation of a corresponding alpha-numeric key.

13. The interface system of claim 12 wherein the software program moves the text cursor back one character space in the highlighted input element in response to actuation of the back selector.

14. The interface system of claim 12 wherein the software program moves the text cursor forward one character space in the highlighted input element in response to actuation of the next selector.

15. The interface system of claim 8 wherein:
the highlighted input element includes a plurality of lines; and
the software program inserts a carriage return in the highlighted input element in response to actuation of the action selector.

16. The interface system of claim 8 wherein:
the highlighted input element is a first input element;
the first screen includes a plurality of input elements;
the first input element includes a single line; and
the software program moves the navigation highlight to a second input element in response to actuation of the action selector.

17. The interface system of claim 8 wherein:
the highlighted input element is a last input element on the first screen; and
the software program navigates to a subsequent screen in response to actuation of the action selector.

18. A method of providing cross-disability access to an electronic device, the electronic device operatively connected to an electronic computer, comprising the steps of:
displaying a first screen of a plurality of screens on a touch screen of the electronic device, a first screen including at least one non-input element having text therein which is unchangeable by a user and at least one input element;
selectively navigating through the plurality of screens by touching the touch screen;
moving a navigation highlight between adjacent elements displayed on the first screen in response to actuation of one of a first set of selectors;
activating a highlighted element displayed on the first screen in response to actuation of an action selector;
navigating through the plurality of screens in response to actuation of one of a second set of selectors when the highlighted element is the non-input element; and
providing context sensitive help to the user in response to actuation of a help selector;
wherein:
activation of a highlighted non-input element displayed on the first screen in response to actuation of the action selector generates an audio reading of the text in the highlighted non-input element; and
activation of a highlighted input element having a plurality of character spaces displayed on the first screen in response to actuation of the action selector causes a text cursor to be displayed in a character space in the highlighted input element.

19. The method of claim 18 wherein the first set of selectors includes:
    an up selector having a non-actuated state and an actuated state, wherein the software program moves a navigation highlight between adjacent elements displayed on the first screen in a first direction in response to actuation of the up selector and
    a down selector having a non-actuated state and an actuated state, wherein the software program moves the navigation highlight between adjacent elements displayed on the first screen in a second direction in response to actuation of the down selector.

20. The method of claim 18 wherein the second set of selectors includes:
    a back selector having a non-actuated state and an actuated state, wherein the software program navigates to a previous screen in response to actuation of the back selector when the highlighted element is the non-input element; and
    a next selector having a non-actuated state and an actuated state, wherein the software program navigates to a subsequent screen in response to actuation of the next selector when the highlighted element is the non-input element.

21. The method of claim 20 wherein the method includes the additional step of displaying an alpha-numeric character in a character space in the highlighted input element in response to actuation of a corresponding alpha-numeric key.

22. The method of claim 21 comprising the additional step of moving a text cursor back one character space in the highlighted input element in response to actuation of the back selector.

23. The method of claim 21 comprising the additional step of moving a text cursor forward one character space in the highlighted input element in response to actuation of the next selector.

24. The method of claim 18 wherein the highlighted input element includes a plurality of lines and wherein the method includes the additional step of inserting a carriage return in the highlighted input element in response to actuation of the action selector.

25. The method of claim 18 wherein the highlighted input element is a first input element; the first screen includes a plurality of input elements; and the first input element includes a single line; and wherein the method includes the additional step of moving the navigation highlight to a second input element in response to actuation of the action selector.

26. The method of claim 18 wherein the highlighted input element is a last input element on the first screen and wherein the method includes the additional step of navigating to a subsequent screen in response to actuation of the action selector.

* * * * *